United States Patent
Watanabe

(10) Patent No.: US 7,096,366 B1
(45) Date of Patent: Aug. 22, 2006

(54) PORTABLE ELECTRONIC DEVICE WITH A SECURITY FUNCTION AND A NONVOLATILE MEMORY

(75) Inventor: Takafumi Watanabe, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/498,995

(22) Filed: Feb. 7, 2000

(30) Foreign Application Priority Data

Feb. 8, 1999 (JP) .................................. 11-029976

(51) Int. Cl.
*G06F 12/14* (2006.01)
*G06F 13/00* (2006.01)
*H04L 9/32* (2006.01)

(52) U.S. Cl. .................. 713/182; 726/21; 726/30; 705/66; 235/382.5

(58) Field of Classification Search ............. 235/382.5; 705/66; 713/200, 182; 726/21, 30
See application file for complete search history.

(56) References Cited

U.S. PATENT DOCUMENTS

| | | | | |
|---|---|---|---|---|
| 4,800,520 A | * | 1/1989 | Iijima | 707/206 |
| 4,839,792 A | * | 6/1989 | Iijima | 235/380 |
| 4,974,208 A | * | 11/1990 | Nakamura et al. | 365/228 |
| 5,039,850 A | * | 8/1991 | Yamaguchi | 235/492 |
| 5,191,608 A | | 3/1993 | Geronimi | |
| 5,365,045 A | * | 11/1994 | Iijima | 235/380 |
| 5,473,690 A | * | 12/1995 | Grimonprez et al. | 705/66 |
| 5,517,014 A | * | 5/1996 | Iijima | 235/492 |
| 5,729,717 A | * | 3/1998 | Tamada et al. | 711/164 |
| 5,862,402 A | * | 1/1999 | Sekiya | 710/2 |
| 5,929,428 A | * | 7/1999 | Iijima | 235/492 |
| 5,959,276 A | * | 9/1999 | Iijima | 235/380 |
| 6,199,762 B1 | * | 3/2001 | Hohle | 235/492 |

FOREIGN PATENT DOCUMENTS

| | | |
|---|---|---|
| EP | 0 795 844 | 9/1997 |
| EP | 0 798 673 | 10/1997 |
| EP | 0 818 761 | 1/1998 |
| EP | 0 847 031 | 6/1998 |

OTHER PUBLICATIONS

Schneier, Bruce; Applied Cryptography; 1996; John Wiley & Sons Inc., 2nd Edition; pp. 21-46, 561-595.*

* cited by examiner

*Primary Examiner*—Kambiz Zand
*Assistant Examiner*—Jung Kim
(74) *Attorney, Agent, or Firm*—Finnegan, Henderson, Farabow, Garrett & Dunner, L.L.P.

(57) ABSTRACT

A portable electronic device with which an owner of the device makes use of a specific application program and a method for issuing the device. An unissued IC card can be written with the specific data without satisfying the security function of the IC card. After the issuance of the IC card, the security function becomes valid and each IC card requires satisfaction of the security function in case of data writing or data rewriting.

10 Claims, 5 Drawing Sheets

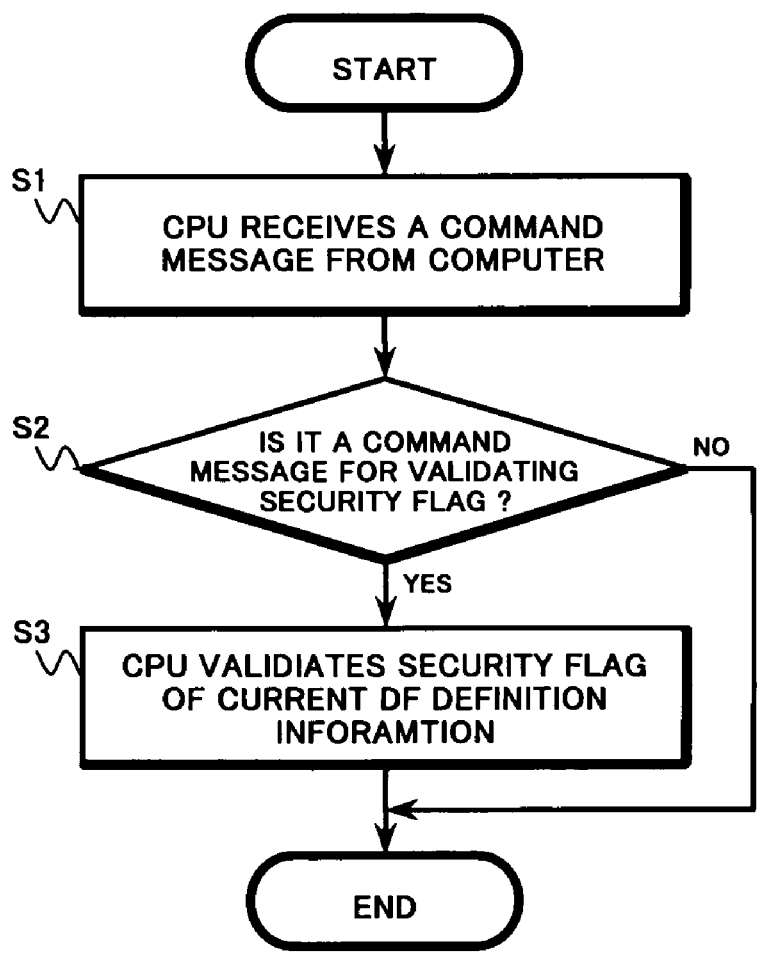

PORTABLE ELECTRONIC DEVICE WITH A SECURITY FUNCTION AND A NONVOLATILE MEMORY

BACKGROUND OF THE INVENTION

I. Field of the Invention

The present invention generally relates to a portable electronic device, and a method for issuing the device. More particularly, the present invention relates to a device and method for achieving high security during application operation and high efficiency while being issued.

II. Background and Material Information

A portable electronic device such as an IC card prevents an unauthorized third person from reading and rewriting data stored in an internal memory, writing new data into the internal memory by a security function realized by, such as, a personal identification number (PIN) code, and encoding data to be transmitted to or from a card reader/writer.

An IC card needs to be written with specific data necessary for operation of each application. For example, an IC card may require entry of an owner's PIN code and cryptographic key for an application so that the IC card can become usable for the application. This process of writing the specific data into the IC card is called "issuance." An issuer usually issues a large number of IC cards with specific data at a time. Each issued IC card requires satisfaction of the security function except for the owner's PIN code. Therefore, because a preparatory process such as a data encoding process must occur before the issuing process, this preparatory process makes issuing the card inefficient.

Therefore, demanded is a mechanism in which (1) an unissued IC card can be written with the specific data without satisfying with the security function and (2) the security function becomes valid after the issuance and each IC card requires satisfaction of the security function in case of data writing or data rewriting. That is, an IC card with which achieves high security during application operation and high efficiency during issuance is demanded.

SUMMARY OF THE INVENTION

In view of the foregoing, the present invention solves the inherent limitations of existing issuing systems by use of a specific application program and a method for issuing the device that substantially obviates one or more of the problems due to limitations and disadvantages of the past approaches.

In accordance with an aspect of the present invention, as embodied and broadly described, the present invention is directed to a portable electronic device. The device comprises means for executing a security function against unauthorized use, the security function is validated by a command received from outside the device, means for storing data necessary to use the application program, and means for storing data indicating whether the security function is valid based on the command.

In accordance with another aspect of the present invention, a portable electronic device is provided. The device comprises a nonvolatile memory and means for storing validity data indicating whether the security function is valid into the nonvolatile memory. The validity data is received as a command message from the outside of the device. The device also includes means for determining whether a command message provided from outside the device includes data for the security function, second means for determining whether the nonvolatile memory is stored with the validity data, and first means for writing or rewriting data into the nonvolatile memory following the command message. The first means writes or rewrites data when the first determining means determines the command message does not to include the data for security function and when the second determining means determines not to store validity data in the nonvolatile memory.

In accordance with another aspect of the present invention, there is provided a method for issuing a portable electronic device. The method comprises providing a security function against unauthorized use into the device, storing in the device data necessary to use the application program, and validating the security function by issuing a command after storing said data. The security function is validated by the command received from outside the device.

It is to be understood that both the foregoing general description and the following detailed description are exemplary and explanatory only and are not restrictive of the invention, as claimed. Further features and/or variations may be provided in addition to those set forth herein. For example, the present invention may be directed to various combinations and subcombinations of the disclosed features and/or combinations and subcombinations of several further features disclosed below in the detailed description.

BRIEF DESCRIPTION OF THE DRAWINGS

The accompanying drawings, which are incorporated in and constitute a part of this specification, illustrate various embodiments and/or features of the invention and together with the description, serve to explain the principles of the invention. In the drawings:

FIG. 8 is a diagram depicting a message format example of a command that validates security flag 510;

FIG. 9 is an exemplary flowchart depicting a process for validating security flag 510 of the DF definition information.

DETAILED DESCRIPTION

The various aspects and features of the present invention will be hereinafter described with reference to the accompanying drawings.

Figure 1:
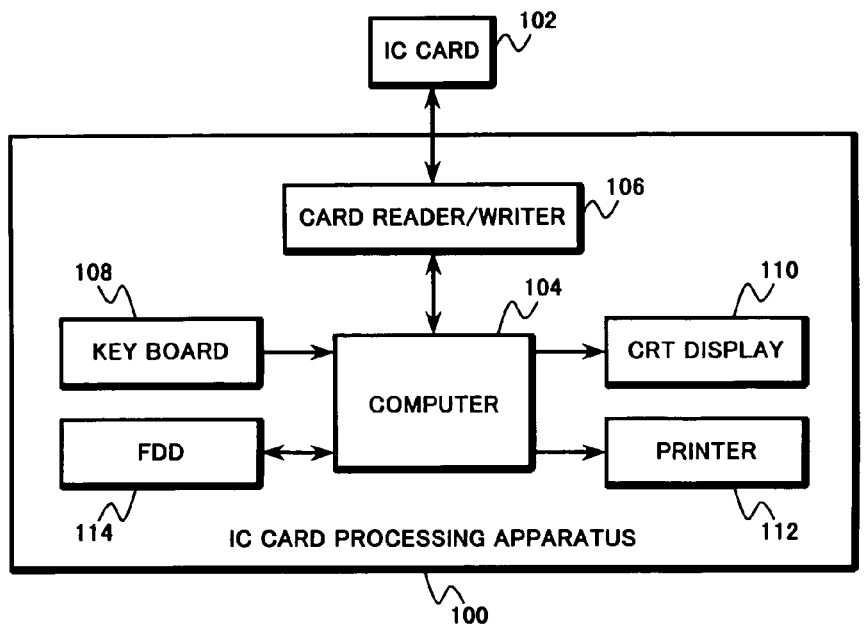
FIG. 1 is an exemplary block diagram depicting the configuration of an IC card processing apparatus 100 according to the principles of the present invention.

FIG. 1 is an exemplary block diagram depicting the configuration of an IC card processing apparatus 100 according to the principles of the present invention. IC card processing apparatus 100 communicates with an IC card 102. IC card processing apparatus 100 comprises a computer 104 which generally controls IC card processing apparatus 100. IC card 102 and computer 104 communicate with each other using a card reader/writer 106. For example, IC card 102 and computer 104 may be physically connected, or not physically connected, such as an antenna. IC card processing apparatus also comprises a keyboard 108 for inputting a command and data, a cathode ray tube (CRT) display 110 for displaying data, a printer 112 for printing data, and a floppy disk drive (FDD) 114 for storing data, all of which are connected to computer 106.

Figure 2:
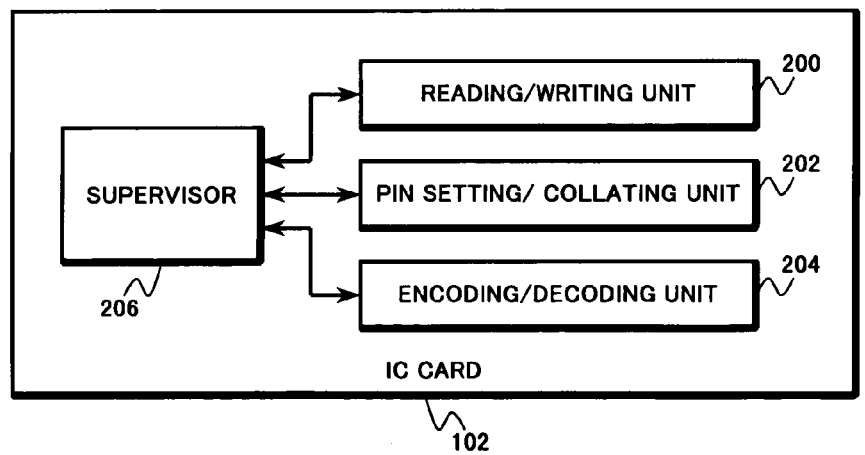
FIG. 2 is an exemplary block diagram depicting the function of IC card 102.

FIG. 2 is an exemplary block diagram depicting the function of IC card 102.

IC card 102 comprises a reading/writing unit 200, a PIN setting/collating unit 202, an encoding/decoding unit 204, and a supervisor 206. Supervisor 206 controls various functions executed by units 200, 202, and 204.

The functions of units 200, 202, and 204 are now further described. Reading/writing unit 200 reads data from and writes data into a data memory 302 (further described below) and a program memory 304 (further described below) with specific commands or specific data provided by computer 104 via card reader/writer 106.

PIN setting/collating unit 202 sets an owner's PIN code in data memory 302 when an IC card is issued, replaces the PIN code when requested by the owner, and collates a PIN code provided by computer 104 in comparison with the set PIN code when the IC card is used.

Encoding/decoding unit 204 encodes data provided by IC card 102 to computer 104, and decodes encoded data provided from computer 104 to IC card 102.

Supervisor 206 receives a command (and data) from card reader/writer 106, interprets that command, and instructs units 200, 202, and 204 to execute various functions, such as read, write, encode, or decode.

Figure 3:
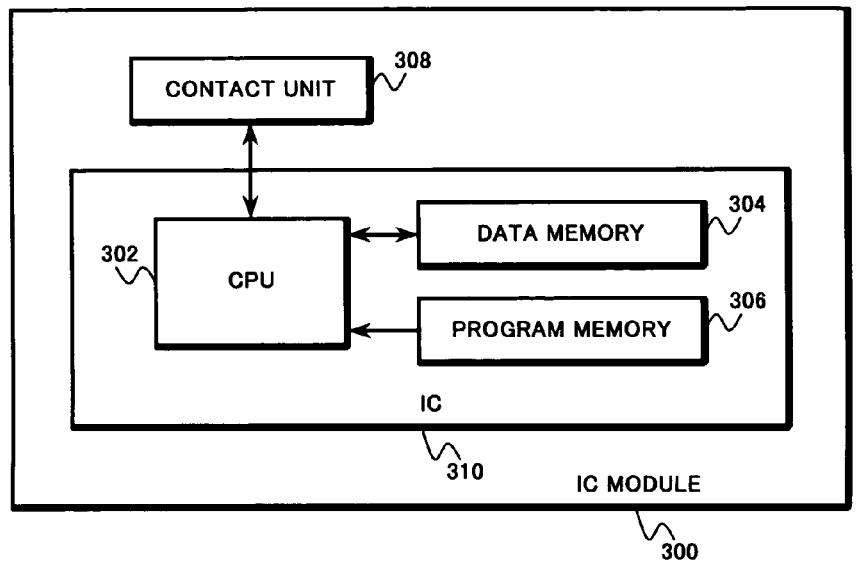
FIG. 3 is an exemplary block diagram depicting the configuration of IC module 300.

FIG. 3 is an exemplary block diagram depicting the configuration of IC module 300.

IC module 300 comprises a CPU 302, a data memory 304, a program memory 306, and a contact unit 308. CPU 302 controls IC module 300. Data memory 304 is a nonvolatile memory for storing various data, such as an EEPROM. Program memory 306 is a mask ROM printed a control program. A mask ROM is a ROM chip printed with data for a program when produced. Contact unit 308 is an interface between IC 310 and card reader/writer 106.

An IC 310 contains CPU 302, data memory 304, and program memory 306. IC module 300 is composed of contact unit 308 and IC 310 connected with contact unit 308. IC card 102 is formed with IC module 300 and a plastic card (not shown) for packing IC module 300.

Figure 4:
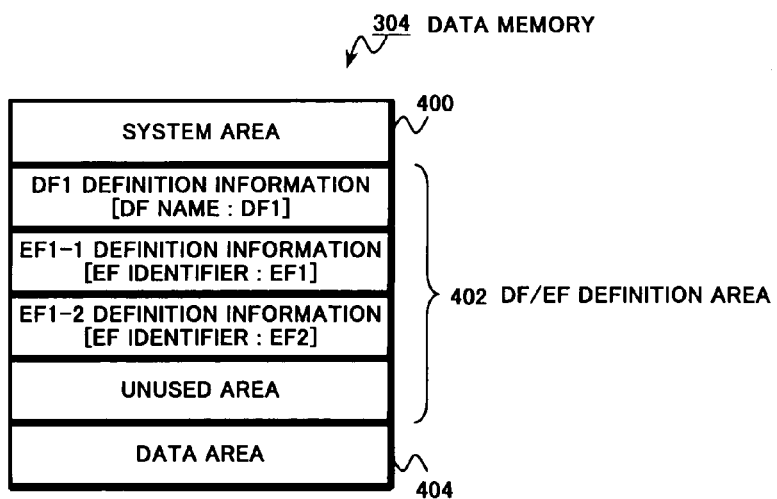
FIG. 4 is a diagram depicting a mapping example in data memory 304 after the issuance.

FIG. 4 is a diagram depicting a mapping example in data memory 304 after the issuance.

Data memory 304 comprises a system area 400, a dedicated file (DF)/elementary file (EF) definition area 402, and a data area 404.

System area 400 stores fixed data and initial value of variable data, both of which are necessary to use IC card 102. Both data are stored in system area 400 before the issuance.

DF/EF definition area 402 stores both DF definition information and EF definition information. DF definition information defines an application, and EF definition information defines data to be used for the application. In FIG. 4, two pieces of EF definition information, EF1-1 and EF1-2, are given respective EF identifiers "EF1" and "EF2." The information is stored in DE/EF definition information area 402 correspondingly to DF definition information named "DF1."

DF/EF definition area 402 also comprises an unused area for storing DF definition information and EF definition information. This information is added when IC card 102 is additionally issued regarding a new application, or when new data is additionally written into a current application.

Data area 404 stores data and CPU 302 manages the stored data using EF definition information. Data area 404 also stores one or more programs for each application. Each application is managed on the basis of DF definition information so that validity or invalidity of the security function of an application can be set separately among applications.

Figure 5:
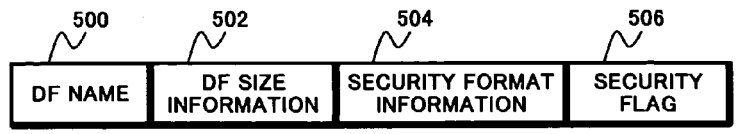
FIG. 5 is a diagram depicting an example of DF definition information.

FIG. 5 is a diagram depicting an example of DF definition information.

DF definition information comprises a DF name 500, DF size information 502, security format information 504, and a security flag 506. Every DF has a unique DF name 500 by which CPU 302 looks up a corresponding DF. DF size information 502 is an area in data memory 304 which both a DF and EFs subordinate to the DF can use. When a new EF is added subordinately to a DF, the size of the new EF is subtracted from the size stored in DF size information. Security format information 504 stores information regarding message formats of writing or rewriting commands to be executed under a DF.

Security flag 506 is set while security of an application is valid. When security flag 506 is set, only a writing or a rewriting command having the same message format as designated by corresponding security format information 504 is accepted, however, writing or rewriting command having other format will be refused, and not accepted.

Figure 6:
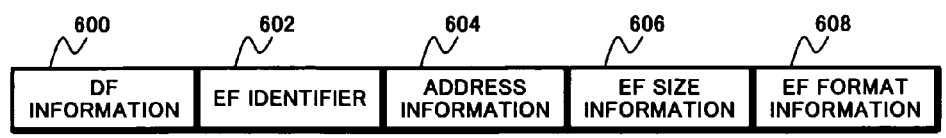
FIG. 6 is a diagram depicting an example of EF definition information generated subordinately to a DF definition information.

FIG. 6 is a diagram depicting an example of EF definition information generated subordinately to a DF definition information.

EF definition information comprises DF information 600, an EF identifier 602, address information 604, EF size information 606, and EF format information 608.

DF information 600 indicates a dominant DF to an EF. Every EF has a unique EF identifier 602 by which control element 302 looks up a corresponding EF. Address information 604 stores an address in a data area managed on the basis of a corresponding EF definition information. EF size information 606 indicates the size of a data area managed on the basis of a corresponding EF definition information. EF format information 608 stores information regarding the structure of an EF definition information. An international organization for standardization (ISO) provides a record structure EF and a transparent structure EF in ISO7816-4. More information on ISO7816-4 may be found in: International Organization for Standardization, "International Standard ISO/IEC 7816: Integrated circuit(s) cards with contacts."

FIGS. 7(a)–(d) are diagrams depicting a writing or rewriting command message format examples.

Figure 7A:
FIGS. 7(a)–(d) are diagrams depicting writing or rewriting command message format examples.

As shown in FIG. 7(a), a format #1 is a basic command of writing or rewriting. The format #1 comprises a command header area and data area. The command header indicates whether the command is a writing command or a rewriting command. The data area comprises data to be written or rewritten to data memory 304. The format #1 is accepted when security flag 506 is not valid.

Figure 7B:
Figure 7C:
Figure 7D:

On the other hand, formats #2–#4 respectively shown in FIG. 7(b)–(d) are accepted when security flag 506 is valid.

As shown in FIG. 7(b), a format #2 comprises encoded data area to conceal data. In this case, security verification is carried out through decoding of the encoded data.

As shown in FIG. 7(c), a format #3 comprises a spare data area to realize justifiability of data. In this case, security verification is carried out by determining the justifiability of the spare data.

As shown in FIG. 7(d), a format #4 comprises an encoded data area, and spare data area to realize concealment and justifiability of data. In this case, security verification is carried out judging from encoding results and justifiability of the spare data.

The formats #2–#4 are designated correspondingly to each DF by security format information 504.

FIG. 8 is a diagram depicting a message format example of a command that validates security flag 510.

The command is composed of single command header area. Immediately after an execution of the command, security flag 510 of the DF definition information is validated.

FIG. 9 is an exemplary flowchart depicting process for validating security flag 510 of the DF definition information.

Computer 104 sends a command message to CPU 302 via card reader/writer 106 and contact unit 306 to validate security flag 510 (shown in FIG. 6). Next, CPU 302 receives the command message (step S1). CPU 302 collates the format type of the command message. That is, CPU 302 determines whether the received command message is a command message for validating security flag 510 (step S2). When CPU 302 determines that the command message is a command message to validate security flag 510, CPU 302 validates security flag 510 which is included in a DF definition information under a current processing, hereinafter referred to 'current DF' (step S3).

Figure 10:
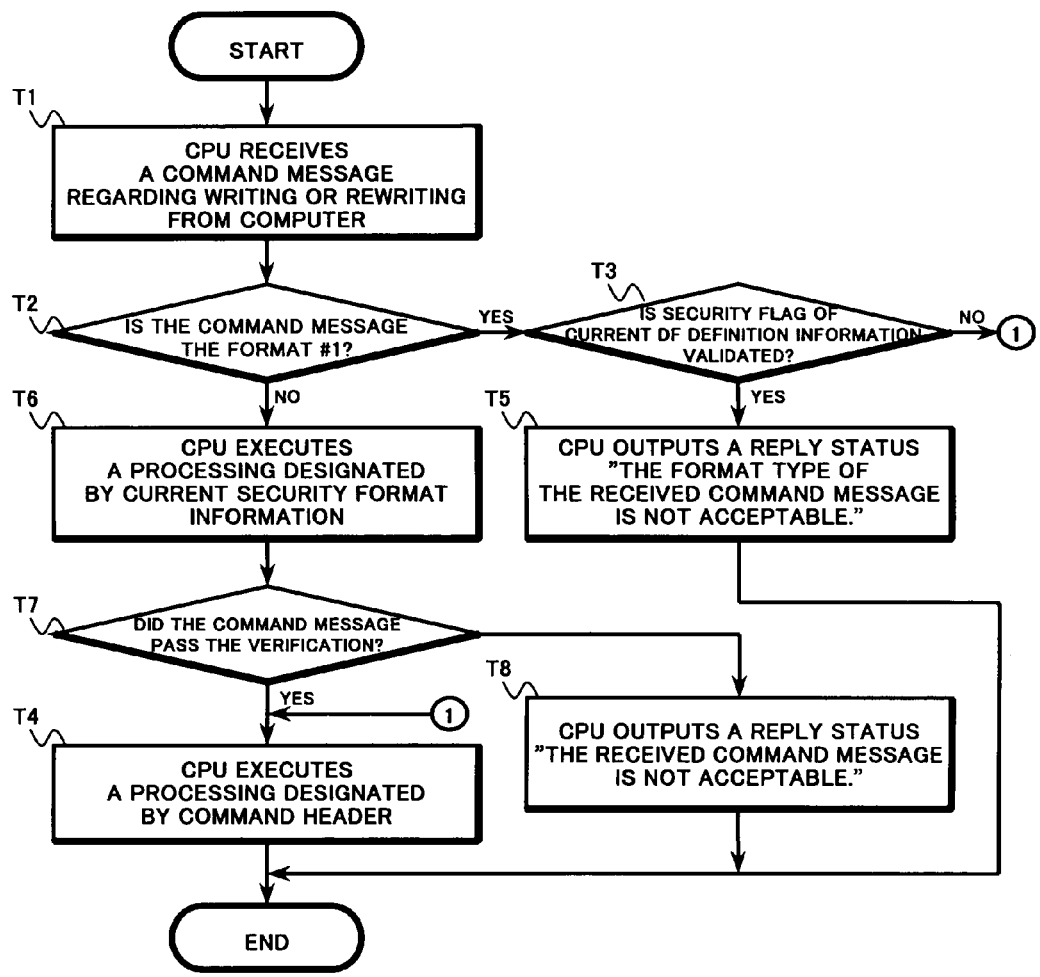
FIG. 10 is an exemplary flowchart depicting a process generated by a command message for writing or rewriting.

FIG. 10 is an exemplary flowchart depicting a process generated by a command message for writing or rewriting.

Computer 104 sends a command message for writing or rewriting (shown in FIG. 7(a)–(d)) to CPU 302 via card reader/writer 108 and contact unit 306. Next, CPU 302 receives the command message (step T1). CPU 302 collates the format type of the command message. CPU 302 then determines whether the type of the command message is the format #1 type (step T2). If the message is format #1, CPU 302 determines whether security flag 510 regarding a current DF definition information is validated (step T3). When the security flag 510 is determined not yet to be validated, CPU 302 writes or rewrites as designated by command header area 800 (step T4).

Therefore, an unissued IC card can be written or rewritten with data for application operation without satisfying the security function and accordingly issuance becomes highly efficient.

When the security flag 510 is determined to be already validated in step T3, CPU 302 sends a reply status indicating "the format type of the received command message is not acceptable." to computer 104 (step T5). Thus format #1 will be refused when security flag 510 is validated.

When CPU 302 determines the format type of command message not to be the format #1 (step T2), CPU 302 writes or rewrites data designated by security format information 504 in the current DF definition information using received command message (step T6).

CPU 302 then determines whether the command message can pass the verification by the security function (step T7). When the command message passes the verification, CPU 302 writes or rewrites data designated in command header area (step T4).

When the command message can not pass the verification, CPU 302 sends a replying status indicating "the received command message is not acceptable" to computer 104 (step T8).

As described above, consistent with the principles of the present invention, an unissued IC card can be written with the specific data without satisfying with the security function and the security function becomes valid after the issuance and each IC card requires satisfaction of the security function in case of data writing or data rewriting. That is, a mechanism in which an IC card with which achieves high security during application operation and high efficiency during issuance.

Other embodiments of the present invention will be apparent to those skilled in the art from consideration of the specification and practice of the invention disclosed herein. It is intended that the specification and examples be considered as exemplary only, with a true scope and spirit of the present invention being indicated by the following claims.

What is claimed is:

1. A portable electronic device with a security function, containing an application program, comprising:
   means for storing validity data indicating whether the security function is valid in a nonvolatile memory;
   first means for determining whether a command message received from outside of the device includes the validity data;
   second means for determining whether the validity data is stored in the nonvolatile memory; and
   first means for writing or rewriting data in the nonvolatile memory after receiving the command message when the first determining means determines that the command message does not include the validity data and the second determining means determines the validity data is not stored in the nonvolatile memory.

2. The device of claim 1, further comprising:
   first means for outputting a status indicating that the command message is not acceptable when the first determining means determines that the command message is not included in the data for the security function and the second determining means determines that the validity data is stored in the nonvolatile memory.

3. The device of claim 1, further comprising:
   third means for determining whether verification of the data for the security function succeeded when the first determining means determines the command message is included in the data for the security function; and
   second means for writing or rewriting data into the nonvolatile memory following the command message when the third determining means determines the verification was successful.

4. The device of claim 3, further comprising:
   second means for outputting a status indicating that the command message is not acceptable when the third determining means determines the verification of the data for the security function was not successful.

5. The device of claim 2 wherein the command message comprises:
   a writing or rewriting command;
   data that is written or rewritten into the nonvolatile memory; and
   additional data guaranteeing validity of the data based on verification of the data.

6. The device of claim 2 wherein the command message comprises:
- a writing or rewriting command; and
- encoded data that is written or rewritten into the nonvolatile memory after being decoded based on verification of the data.

7. The device of claim 3 wherein the command message comprises:
- a writing or rewriting command;
- encoded data that is written or rewritten into the nonvolatile memory after being decoded; and
- additional data guaranteeing validity of the data, wherein:
- the verification of the data is performed based on the encoded data and the additional data.

8. The device of claim 2, wherein the nonvolatile memory stores a plurality of security programs different from each other depending on a corresponding application program.

9. The device of claim 6, wherein a plurality of security programs are separately validated in response to a prescribed command message for validation, and wherein each security program corresponds to an application program.

10. The device of claim 6, wherein at least one available format of the command message is separately defined, and wherein each format corresponds to an application program.

* * * * *